INVENTOR
ALAN D. KASKE
BY Thomas J. Nikolai
ATTORNEY

Nov. 25, 1969 A. D. KASKE 3,480,928

MAGNETIZABLE MEMORY ELEMENT HAVING A PLURALITY OF READ-ONLY DATA STATES

Filed Sept. 21, 1967 5 Sheets-Sheet 2

Nov. 25, 1969 A. D. KASKE 3,480,928

MAGNETIZABLE MEMORY ELEMENT HAVING A PLURALITY OF READ-ONLY DATA STATES

Filed Sept. 21, 1967 5 Sheets-Sheet 3

United States Patent Office 3,480,928
Patented Nov. 25, 1969

3,480,928
MAGNETIZABLE MEMORY ELEMENT HAVING A PLURALITY OF READ-ONLY DATA STATES

Alan D. Kaske, Minneapolis, Minn., assignor to Sperry Rand Corporation, New York, N.Y., a corporation of Delaware Filed Sept. 21, 1967, Ser. No. 669,493
Int. Cl. G11b 5/00
U.S. Cl. 340—174 5 Claims

ABSTRACT OF THE DISCLOSURE

A magnetizable read-only memory element that permits the storage of any one of a plurality of read-only data states in the nondestructive (NDRO) mode. The NDRO storage mode involves the relative angle of skew of the element's magnetic easy axis from a line that is parallel to the magnetic axis of the inductively coupled sense line. By utilizing a read drive field that is directed orthogonal to the sense line's magnetic axis and that is of a "stepped" configuration in conjunction with step field intensities of particular relationships there are provided uniquely distinguishable output signals for each skew angle, i.e., each memory state.

BACKGROUND OF THE INVENTION

The present invention is an improvement invention in the memory element disclosed in the copending patent application of R. J. Bergman, Ser. No. 672,686, filed Oct. 2, 1967, assigned to the Sperry Rand Corporation as is the present invention. This copending patent application of R. J. Berman discloses a Bakore memory element that may be incorporated in a compact three-dimensional memory system packaging scheme while permitting the storage of digital data therein by well-known annealing techniques. The Bakore memory element is a single, magnetizable memory element that permits the simultaneous storage of two logically different bits of information in the DRO mode and NDRO mode. The NDRO storage mode involves the relative angle of skew of the element's magnetic axis from a parallel to the applied longitudinal field that is provided by an energized and enveloped common bit-sense line.

The magnetization of the Bakore memory element is first set into a first, or a second and opposite direction that is determined by the polarity of a drive field provided by the energized drive line. This establishing of the magnetization of the Bakore memory element into a first or a second and opposite direction comprises the preconditioning magnetic write-in operation. Next, with a relatively low intensity transverse drive field applied to the element, the element is subjected to an elevated temperature, or "baked," for a sufficient period of time to permit a predetermined skew angle to be established in the magnetizable layer of the element. This bake-in operation causes the layer's magnetization to be rotated out of alignment with the magnetic axis of the enveloped drive line at an angle equal to or greater than the dispersion angle $\alpha 90$ of the element's magnetizable layer. This comprises the thermal write-in operation. With the skew axis established by the thermal write-in operation the NDRO information is set into the memory element. By applying the proper drive fields to the element the magnetization may be set into a DRO informational state that is different than the NDRO informational state achieved by the bake-in process, i.e., the memory element may store a DRO "1" and a DRO "0" or vice versa. Further, the memory element may store a NDRO "1" and a DRO "1" or, alternatively, an NDRO "0" and a DRO "0."

SUMMARY OF THE INVENTION

The present invention relates to the method of storing NDRO information in a read-only magnetizable memory element by establishing the element's easy axis at any one of a plurality of angles rotated away from, or skewed with respect to, the magnetic axis of an inductively coupled sense line. Each easy axis orientation has its own particularly associated output signal of a distinctive waveform induced in the inductively coupled sense line whereby the particular informational content of the interrogated, or readout, element may be distinguished from all other possible informational states. Due to the possible irreversible switching of the magnetization of the memory element upon readout the read operation is always followed by an unconditional restore operation much in the nature of the NDRO operation of a transfluxor element. The inductively coupled read-restore line is preferably oriented orthogonal to the sense line whereby minimum deleterious cross-talk is achieved for a maximum signal-to-noise ratio. Accordingly, it is a primary object of the present invention to provide a novel read-only memory element, and a method of operation thereof, having a plurality of informational states.

DESCRIPTION OF THE PREFERRED EMBODIMENTS

Figure 1:
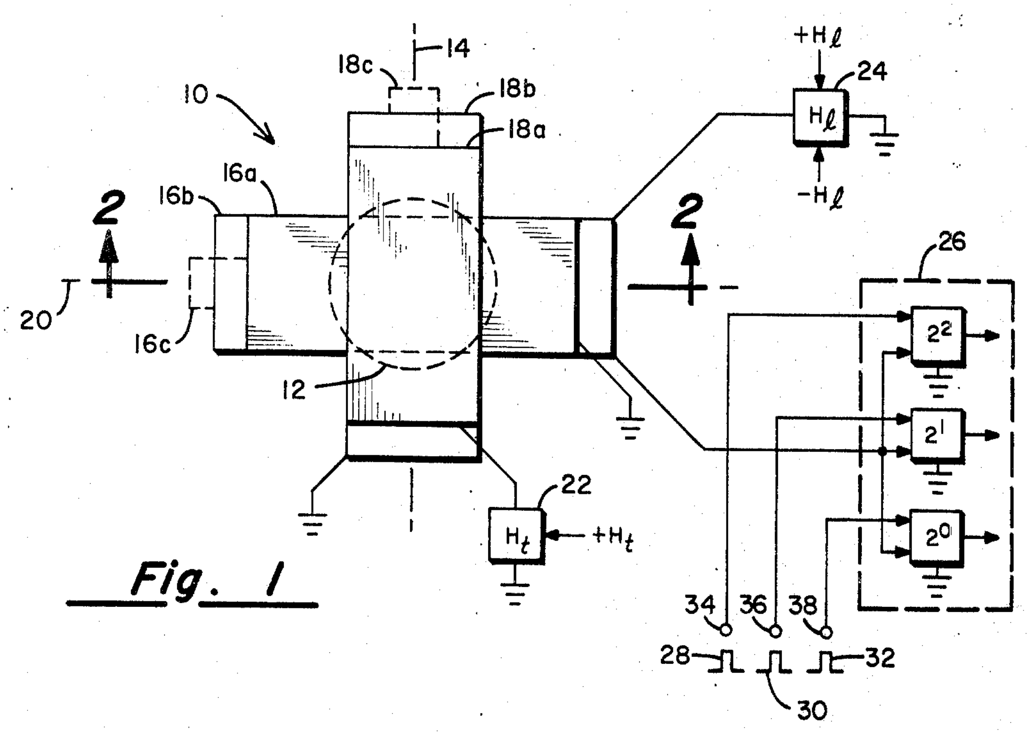
FIG. 1 is an illustration of a plan view of a first preferred embodiment of the present invention.

With particular reference to FIG. 1 there is presented an illustration of a plan view of a first preferred embodiment of the present invention. Memory device 10 is comprised of the thin-ferromagnetic-film layer 12 having single-domain properties and the characteristic of uniaxial anisotropy providing an easy axis, aligned with axis 14, along which its remanent magnetization M shall be in a first or a second and opposite polarization. Layer 12 is enveloped by sense line 16, consisting of upper portions **16*a* and lower portions 16*b* intercoupled by electrical conductor 16*c*, and by word line 18 consisting of upper portion 18*a* and lower portion 18*b* intercoupled by electrical conductor 18*c*. Lines 16 and 18 are arranged in a stacked superposed relationship about and enveloping layer 12 with their magnetic axes orthogonal along axes 14 and 20, respectively. Word line 18 is at one end coupled to a pulse source 22 which when energized causes line 18 to couple to layer 12 a drive field that is oriented parallel to axis 20. Drive line 16 at one end is coupled to a pulse source 24 which when energized for the thermal write-in operation couples to layer 12 a drive field that is oriented parallel to axis 14. Additionally, lines 16 is, at the same end, coupled to a register 26 having a plurality of stages $2^0$, $2^1$, $2^2$ which when gated by the corresponding gating pulses 32, 30, 28 at gating terminals 38, 36, 34, respectively, store the correspondingly ordered informational bits read out of memory element 10. As will be discussed in further detail hereinbelow the informational state of memory element 10 shall be interpreted by register 26 as a series of output pulses of a first or of a second and opposite polarity arbitrarily being defined herein as representative of a "1" or a "0" with the informational state of memory element 10** being defined by a three bit code $2^2$, $2^1$, $2^0$. It is to be appreciated upon inspection of FIGS. 1 and 2 that the illustrated embodiment does not include those elements not necessary for an operative embodiment but does include only those elements that play an active part in the operation thereof. Accordingly, it is to be appreciated that any of many well known fabrication techniques may be utilized with the fabrication of the preferred embodiments; one example being that disclosed in the S. M. Rubens et al. Patent No. 3,030,612 and Patent No. 3,155,561.

Figure 2:
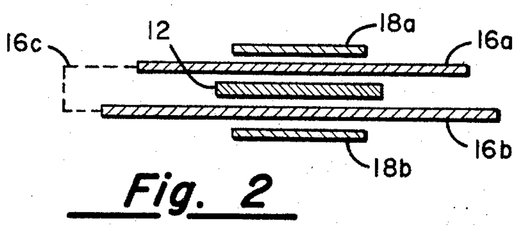
FIG. 2 is an illustration of a cross-sectional view of the memory device of FIG. 1 taken along axis 2—2.

With particular reference to FIG. 2 there is presented an illustration of a cross-section of memory element 10 of FIG. 1 taken along axis 2—2, or axis 20. FIG. 2 particularly illustrates the sandwiched arrangement of layer 12 and lines 16, 18. This view further particularly illustrates the superposed portions of lines 16, 18 at the intersection of their orthogonal magnetic axes 14 and 20, respectively, in the area of layer 12.

Although in the above discussed embodiment illustrated in FIG. 1 the easy axis of layer 12 was discussed as being parallel to axis 14 and, correspondingly, the magnetic axis of drive line 16 this easy axis orientation is presented merely for an initial discussion of the illustrated memory device 10 of FIG. 1. As discussed hereinabove it has been stated that the present invention relates to the method of storing NDRO information in a read-only magnetizable memory element by establishing the element's easy axis at one of a plurality of angles rotated away from, or skewed with respect to, the magnetic axis of the inductively coupled sense line 16, i.e., axis 14. It will be shown in more detail below that each skew axis orientation, i.e., a particular angle which the easy axis of layer 12 is rotated away from axis 14, has its own particularly associated output signal of a distinctive waveform induced in the inductively coupled sense line 16.

The particular informational content of the interrogated, or readout, memory element 10 consists of a series of four pulses, only three of which pulses need be utilized, the particular polarities of which pulses are unique for each possible informational state of memory element 10. Accordingly, as will be discussed in more detail below, it is to be understood that the easy axis orientation of layer 12 in memory element 10 of FIG. 1 is, in its final state, oriented at any one of a plurality of possible skew axes with respect to axis 14. Each particular skew axis orientation provides, upon readout, the unique three pulse code coupled to register 26, which three pulses are coupled into their respectively associated stage by the respectively associated gating pulse 28, 30 and 32. In the subsequent discussion with respect to the first preferred embodiment of FIG. 1 these plurality of skew axes shall be discussed as being achieved by the thermal annealing method similar to that disclosed in the copending patent application of R. J. Bergman, Ser. No. 672,686, filed Oct. 2, 1967. However, it is to be understood that any technique whereby the easy axis of a thin-ferromagnetic-film layer may be established at any one of a plurality of possible skew angles with respect to the magnetic axis of an inductively coupled sense line may be utilized, the second preferred embodiment described below and illustrated in FIG. 12 being only one other possible arrangement utilizing the inventive concept of the present invention.

Figure 3:
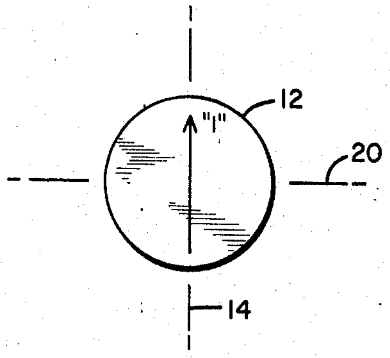
FIG. 3 is an illustration of the magnetization polarization of the memory element of FIG. 1 after subjection to the preconditioning magnetic write-in of a "1."
Figure 4:
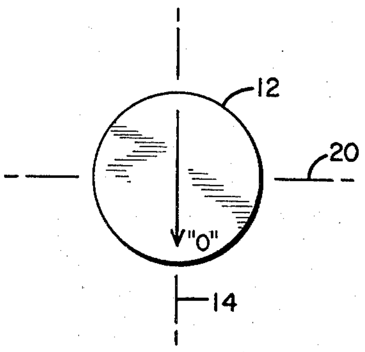
FIG. 4 is an illustration of the magnetization polarization of the memory element of FIG. 1 after subjection to the preconditioning magnetic write-in of a "0."

As stated above, the present invention permits the storage, in a magnetizable memory element, of a plurality of read-only stable states in the NDRO mode. This NDRO storage mode involves the relative angle of skew of the element's magnetic easy axis from a line parallel to the inductively coupled sense line and from a line parallel to the inductively coupled drive line. With particular reference to FIGS. 3 and 4 there are presented illustrations of the easy axis orientation and flux polarization in layer 12. As previously discussed, with particular reference to FIGS. 1 and 2, the polarization of the magnetization M of layer 12 in established in a first or a second and opposite direction along its easy axis, parallel to axis 14, which first or second and opposite polarizations are, for purposes of the present discussion, representative of the preliminary step in the storing of a "1" and a "0," respectively. The magnetization polarization of FIGS. 3 and 4 may be considered to be the preconditioning magnetic write-in states of layer 12 prior to the thermal annealing process whereby the easy axis of layer 12 is to be established at any one of a plurality of skew angles with respect to axis 14.

Figure 5:
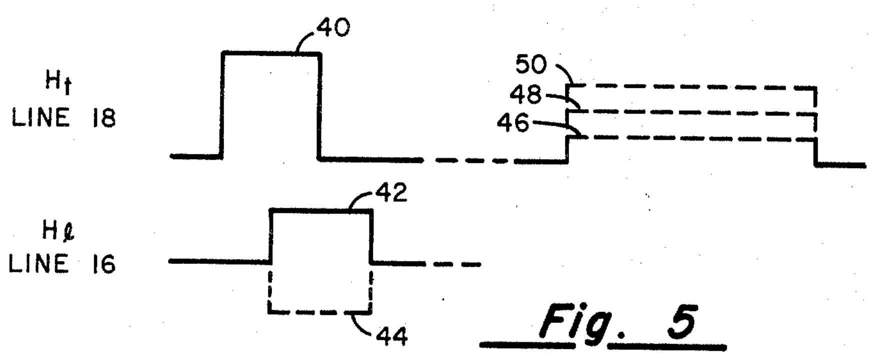
FIG. 5 is an illustration of the signal timing relationships of the preconditioning magnetic write-in and the thermal write-in operations for achieving the informational states of FIGS. 6–11.

With memory element 10 having been formed in the first preferred embodiment of FIG. 1 by any one of the above discussed methods, such as those of the above referenced S. M. Rubens et al. patents, the intial step in the preparation of memory element 10 for the storage of information therein comprises the following steps. Further, the discussion of the applied current signals and the resulting drive fields relating to the thermal write-in, or bake-write, operation of the following steps is particularly directed toward the current signal timing relationships associated with FIG. 5.

(1) Pulse source 22 couples a current signal 40 to word line 18 generating in the area of layer 12 a transverse drive field $H_t$ of an intensity equal to or greater than $H_k$ of layer 12. This causes the magnetization of layer 12 to become substantially aligned with axis 20.

(2) Pulse source 24 couples current signal 42 or 44 of equal but opposite polarities to drive line 16. Drive field 42, representative of the writing in of a "1" or drive field 44 representative of the writing in of a "0" are of a sufficient intensity in the area of layer 12 to steer the magnetization of layer 12 into the proper polarization so that upon the subsequent removal of the concurrently applied transverse drive field 40 the remanent magnetization M thereof shall assume the polarizations noted in FIGS. 3 or 4.

(3) Pulse source 22 is de-energized removing transverse drive field 40 from the area of layer 12 permitting the concurrently applied longitudinal drive field 42 or 44 to force the magnetization thereof to become aligned along axis 14 in the proper polarity as noted in FIGS. 3 and 4.

(4) Pulse source 24 is de-energized terminating the so applied drive fields 42 or 44 whereupon the magnetization M of layer 12 resides in the static, or remanent, conditions of polarization along axis 14 as noted in FIGS. 3 and 4.

Figure 6:
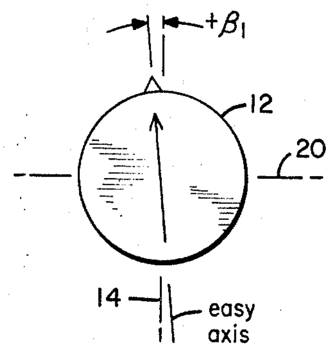
FIG. 6 is an illustration of the magnetization polarization and easy axis orientation for the $+\beta 1$ informational state.
Figure 9:
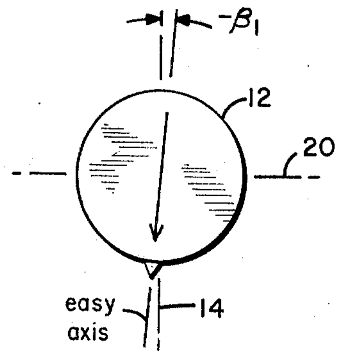
FIG. 9 is an illustration of the magnetization polarization and easy axis orientation for the $-\beta 1$ informational state.

(5) Pulse source 22 is energized coupling current signals 46, 48 or 50 to word line 18 generating in the area of layer 12 a corresponding transverse drive field 46, 48 or 50. Each of drive field 46, 48 or 50 is, in the area of layer 12, of a sufficient intensity to rotate the magnetization of layer 12 out of alignment with its axis 14 causing it to be rotated, or skewed therewith, an associated angle $\beta 1$, $\beta 2$, or $\beta 3$. Depending upon the prior preconditioning magnetic write-in state of layer 12 having been established in the "1" or "0" magnetic polarizations of FIGS. 3 or 4, respectively, each applied drive field 46, 48 and 50 will cause the magnetization M of layer 12 to be rotated a first or a second and opposite direction away from its prior aligned conditions along axis 14. As an example, with the magnetization M of layer 12 established in the "1" state of FIG. 3 the application of drive field 46 will cause the magnetization of layer 12 to be rotated in a counter-clockwise direction away from axis 14 into a skew axis defined as $+\beta 1$. This particular magnetization M polarization is illustrated in FIG. 6. Correspondingly, with the magnetization M of layer 12 having been priorly established in the "0" magnetic polarization of FIG. 4 the application of drive field 46 of layer 12 would cause the magnetization to be rotated a clockwise direction away from axis 14 at an angle defined as $-\beta 1$. This particular magnetic orientation is illustrated in FIG. 9.

With particular reference to FIGS. 6 through 11 there are presented the particular magnetization polarizations associated with the application of drive fields 46, 48 or 50 to layer 12, layer 12 having priorly been established in the "1" or the "0" magnetic states of FIGS. 3 or 4, respectively, by the application of the associated drive fields 42 or 44, respectively. Thus, when the magnetization M of layer 12 has priorly been established in the "1" polarization of FIG. 3 the application of drive field 46 would establish the magnetization of layer 12 along a skew axis defined as $+\beta 1$; the application of drive field 48 would establish the magnetization of layer 12 along the skew axis defined as $+\beta 2$; and, the application of drive 50 to layer 12 would cause the magnetization thereof to be established along the skew axis defined as $+\beta 3$. Alternatively, with the magnetization M of layer 12 having been priorly established in the "0" polarization of FIG. 4 the application of drive fields 46, 48 and 50 would establish the magnetization of layer 12 along the skew axes defined as $-\beta 1$, $-\beta 2$ and $-\beta 3$, respectively, associated with FIGS. 9, 10 and 11, respectively.

(6) With transverse drive fields 46, 48 or 50 applied to layer 12, memory element 10 is placed into an environment of an elevated temperature for a sufficient period to induce the predetermined skew axes $\pm\beta 1$, $\pm\beta 2$, $\pm\beta 3$ of FIGS. 6 through 11 in layer 12. This annealing of layer 12 by the concurrently applied drive fields 46, 48 or 50 and the elevated temperature is a well known phenomenon, and, accordingly, no detailed discussion of the mechanism thereof is believed necessary.

(7) The elevated temperature to which layer 12 is subjected is terminated whereby layer 12 is permitted to return to ambient room temperature.

(8) Pulse source 22 is de-energized terminating drive field 46, 48 or 50 permitting the remanent magnetization M of layer 12 to assume a remanent polarization along the induced easy axes $\pm\beta 1$, $\pm\beta 2$ or $\pm\beta 3$ of FIGS. 6 through 11; each skew axis and the associated magnetization M polarization denoting the storage of an associated NDRO informational state.

Figure 12:
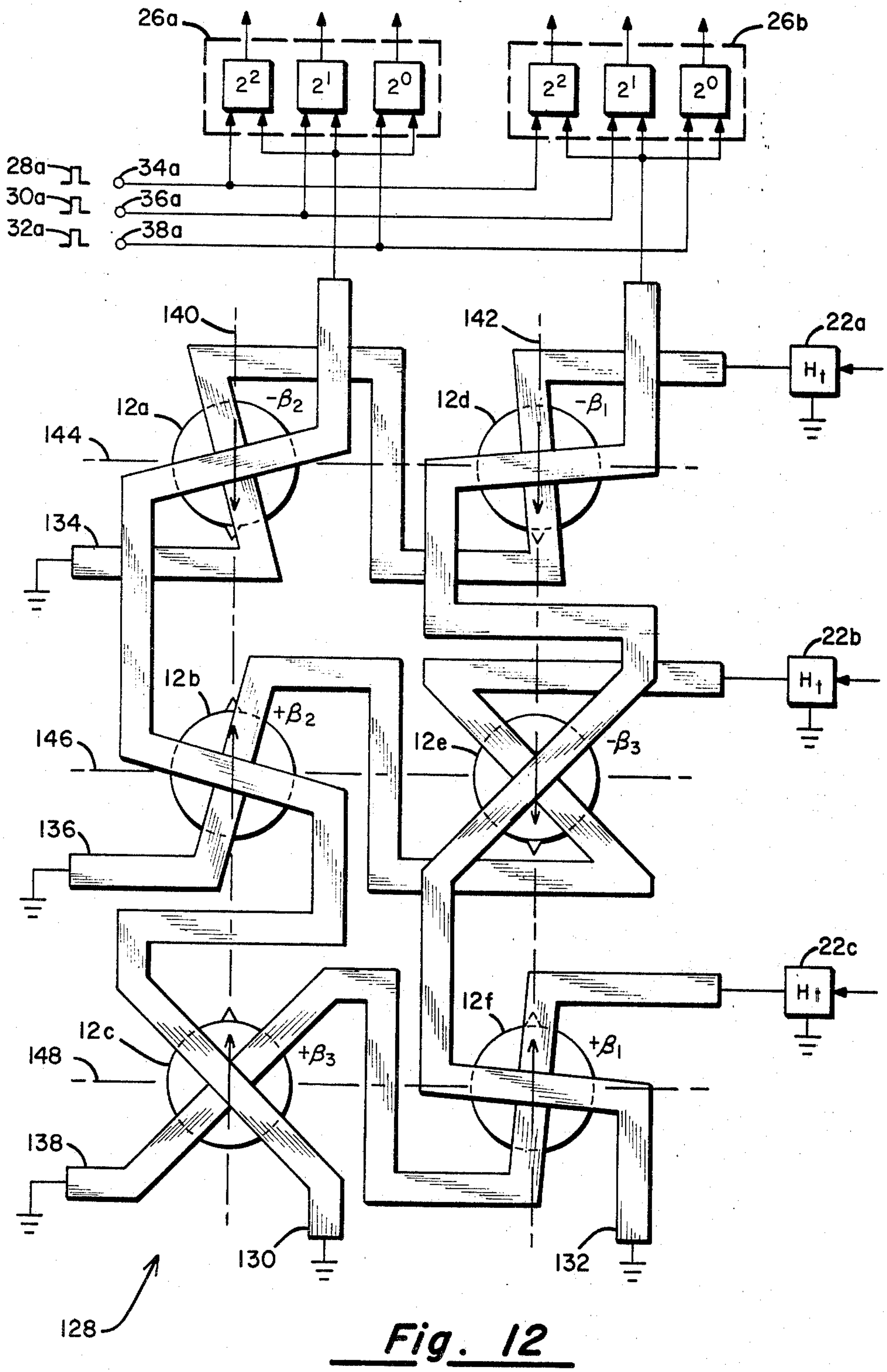
FIG. 12 is an illustration of a second preferred embodiment of the present invention.

With particular reference to FIG. 12 there is presented a second preferred embodiment of the present invention. Remembering that the present invention relates to a method of storing NDRO information in a read-only magnetizable memory element by establishing the element's easy axis at one of a plurality of angles rotated away from, or skewed with respect to, the magnetic axis of an inductively coupled sense line memory system 128 of FIG. 12 utilizes another technique to achieve this same arrangement. Memory system 128 consists of a plurality of layers **12*a*–12*f* arranged in a matrix array, one layer 12 at each intersection of the vertical axes 140, 142 and the horizontal axes 144, 146, 148. All the layers 12 along each horizontal axis are coupled by the same word line while all layers 12 oriented along each vertical axis are coupled by the same sense line. Thus, layers 12*a*, 12*b* and 12*c* are coupled by sense line 130 which at one end is grounded and at the other end is coupled register 26*a*. In a like manner layers 12*d*, 12*e* and 12*f* are coupled to the same sense line 132 which at one end is grounded and at the other end is coupled to register 26*b*. As before, strobe gate pulses 28*a*, 30*a*, 32*a* at terminals 34*a*, 36*a*, 38*a*, respectively, are coupled to the associated stages $2^2$, $2^1$, $2^0$, respectively, of registers 26*a* and 26*b***.

In this embodiment of the present invention the easy axes of layers **12*a* through 12*f* are all oriented in parallel along their respectively associated vertical axis 140 or 142. The $\beta$ stored states are achieved, in this embodiment by providing word lines 134, 136 and 138 each associated with layers 12*a*, 12*d*, layers 12*b*, 12*e* and layers 12*c*, 12*f*, respectively, which word lines at one end are coupled to ground and at the other ends are coupled to pulse sources 22*a*, 22*b* and 22*c*, respectively. The sense lines 130 and 132 are arranged to have segments which in the areas of the respectively associated layers 12 have their magnetic axes oriented the respectively associated angles $\beta$ with respect to the associated vertical axes 140 or 142 whereby there is achieved the desired relationship of the layer's easy axis being skewed with respect to, or rotated away from the magnetic axis of the inductively coupled sense line 130 or 132. Additionally, the respectively associated word lines 134, 136 and 138 have segments which at their respectively associated layers 12*a* through 12*f* are oriented orthogonal to the respectively associated segments of the word lines 130 and 132 providing the desired word line 134, 136, 138 and sense line 130 and 132** orientations for the achievement of optimum signal-to-noise ratios.

OPERATION

Figure 13:
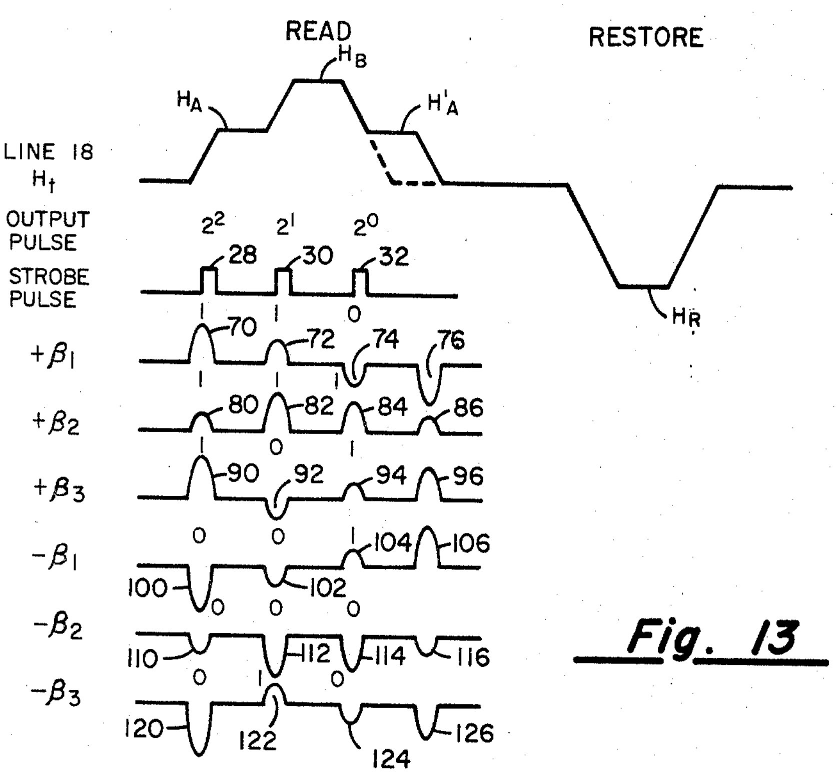
FIG. 13 is an illustration of the signal timing relationships associated with the read-restore operation of the memory element of FIG. 1.

With particular reference to FIG. 13 there is presented an illustration of the signal timing relationship at associated with the read-restore operation of the memory element 10 of FIG. 1. FIG. 13 presents the pulse program $H_A$, $H_B$, $H_A'$ defined by the associated current signal coupled to line 18 by pulse source 22. Associated with the read pulse program there are illustrated the plurality of output pulse permutations inductively coupled into sense line 16 that are associated with the respective storage states $+1$, $+\beta 2$, $+\beta 3$, $-\beta 1$, $-\beta 2$ and $-\beta 3$. Further, there is illustrated the sense strobe gate pulse sequence of strobe pulses 28, 30, 32 for the gating of the respectively associated output signal in line 16 into the respectively associated stage $2^2$, $2^1$, $2^0$ of register 26. Lastly, there is presented the waveform of the restore drive field $H_R$ that is coupled to layer 12 by an energized pulse source 22 for restoring, after the read operation, the magnetization of layer 12 back into its original magnetization polarization as indicated in FIGS. 6–11. The restore operation, consisting of the application of the drive field $H_R$ to the readout layer 12, is an unconditional occurrence irrespective of the informational state of layer 12 and is in the nature of the restore operation associated with the well known operation of a Transfluxor element. Not withstanding the need for the unconditional restore operation achieved by the application of drive field $H_R$ it is to be appreciated that the magnetization of the readout layer 12 is always restored into its original informational state prior to the read operation and, accordingly, the informational states illustrated in FIGS. 6–11 are NDRO informational states.

With particular reference to FIGS. 14–19 there are presented illustrations of the switching asteroid 60 and the drive field relationships related to the read-store operation of the $\beta$ stored states of FIGS. 6–11. Switching asteroid 60 is a well known phenomenon that may be defined as the curve that defines the switching characteristics of a thin-ferromagnetic-film layer having single-domain properties. The term "single-domain property" may be considered the magnetic characteristic of a three-dimensional element of magnetizable material having a thin dimension that is substantially less than the width and length thereof wherein no magnetic domain walls can exist parallel to the large surface of the element. The term "magnetizable" material shall designate a substance having a remanent magnetic flux density that is substantially high i.e., approaches the flux density at magnetic saturation. Additionally, with respect to the description of the present invention the terms "signal" "pulse" etc. when used herein shall be used interchangeably to refer to the current signal that produces the corresponding magnetic field and to the magnetic field that is produced by the corresponding current signal. With particular reference to the switching asteroid 60 a more detailed discussion thereof, than that which shall be presented herein, is presented in the S. M. Rubens et al. Patent No. 3,030,612 or the publication "Ferromagnetic Films," S. M. Rubens, Electro-Technology, September 1963, pages 114–122*a*.

To better understand the following discussion of the switching asteroids 60 and the related drive field relationships of FIGS. 14–19 as related to the signal timing relationships of the read-restore operation signal waveforms of FIG. 13 the following terms nad their corresponding definitions are listed below.

| Term | Definition |
|---|---|
| $\beta$ | Stored state of layer **12**, also the skew angle of the easy axis of layer **12** with respect to axis **14**; six $\beta$ stored states, $+\beta$**1**, $+\beta$**2**, $+\beta$**3**, $-\beta$**1**, $-\beta$**2**, $-\beta$**3**, are utilized in the illustrated embodiments and are illustrated in FIGS. 6–11. |
| Axis **14** | The magnetic axis of the sense line **16** of FIG. 1. |
| Axis **20** | The magnetic axis of the read-restore drive line **18**; is orthogonal to axis **14** for optimum signal-to-noise ratio. |
| Axis **62** | The axis of the switching asteroid **60** that is rotated $\beta$ degrees with respect to axis **14**. |
| Axis **64** | The axis of the switching asteroid **60** that is orthogonal to axis **62**. |
| $H_A$ | Drive field A of the read operation pulse program of FIG. 13. |
| $H_B$ | Drive field B of the read operation pulse program of FIG. 13. |
| $H_A'$ | Drive field A′ of the read operation pulse program of FIG. 13 applied after the drive field B. |
| $H_R$ | Drive field R of the restore operation of FIG. 13. |
| $M_O$ | Remanent magnitization polarization along the skew axis $\beta$ in the $\beta$ stored state, and also after application of the restore drive field $H_R$ of FIG. 13. |
| $M_O'$ | Remanent magnetization polarization along the skew axis $\beta$ after application of the read drive fields $H_A$ and $H_B$ of FIG. 13. This polarization occurs when the data states are $+\beta$**2**, $-\beta$**2**, $+$**3**, $-\beta$**3**. |
| $M_A'$ | Magnetization polarization of $M_O$ upon the application of drive field $H_B$. |
| $M_B$ | Magnetization polarization of $M_O$ upon and after the application of drive field $H_B$. |

Discussion of the operation of layers 12 having the $\beta$ storage states of FIGS. 6–11 shall proceed with respect to the signal timing relationships of FIG. 13 and the switching asteroid 60 and resulting drive field and magnetization vectors of FIGS. 14–19. However, before discussing each of FIGS. 14–19 in detail a more general discussion of the factors that determine the $\beta$ stored states, i.e., the angular rotation of axis 62 of switching asteroid 60 with respect to axis 14, and the drive fields $H_A$, $H_B$ and $H_R$ intensities in the area of the layer 12 shall be had.

Initially, it can be stated as obvious that in an embodiment of the present invention, a illustrated in the first preferred embodiment of FIG. 1 utilizing six $\beta$ stored states, it is necessary that the readout of each stored state provide a unique, and related, output signal. Accordingly, it is essential that the six $\beta$ stored state illutrated in FIGS. 6–11 provide six unique output signals, each output signal being representative of the associated $\beta$ stored state. In the present invention these unique output signals consist of a plurality of pulses of a first or of a second and opposite polarity. Arbitrarily defining a positive output pulse as a "1" and a negative output pulse as a "0," the read pulse program of $H_A$, $H_B$, $H_A'$ of FIG. 13 provides four output pulses; one pulse on the application or the termination of each of fields $H_A$, $B_B$, $H_A'$. Thus, there are provided four output pulses of a first or of a second and opposite polarity. As there are only six $\beta$ stored states utilized, it is apparent that only three output pulses provide sufficient permutations to uniquely define each different $\beta$ stored state. Accordingly, only the first three output pulses are utilized; at the application of field $H_A$, at the application of field $H_B$, and at the termination of field $H_B$ and the concurrent application of field $H_A'$. It is thus apparent that field $H_A'$ need not be utilized, as noted by the dashed line in the read pulse program of FIG. 13. However, for purposes of providing a symmetrical read pulse program field $H_A'$ is utilized with the obtained fourth output pulse being ignored.

Relative intensities of fields $H_A$, $H_B$, $H_A'$ in the area of layer 12 are selected to provide the six unique serial output pulses while the intensity of field $H_R$ in the area of layer 12 is selected to ensure the complete switching of the magnetization M of layer 12 regardless of its vectorial orientation with respect to drive field $H_R$. Using FIGS. 14, 15 and 16 as examples with a $+\beta$1 of 5°, a $+\beta$2 of 15°, and a $+\beta$3 of 45° the following drive field intensities were selected.

(a) $H_A$ within the switching asteroid 60 for the $\beta$ stored states $+\beta$1, $+\beta$2. $H_A$ without the switching asteroid 60 for the $\beta$ stored state $+\beta$3.

(b) $H_B$ within the switching asteroid 60 for the $\beta$ stored state $+\beta$1. $H_B$ without the switching asteroid 60 for the $\beta$ stored states $+\beta$2, $+\beta$3.

Figures 14, 15:
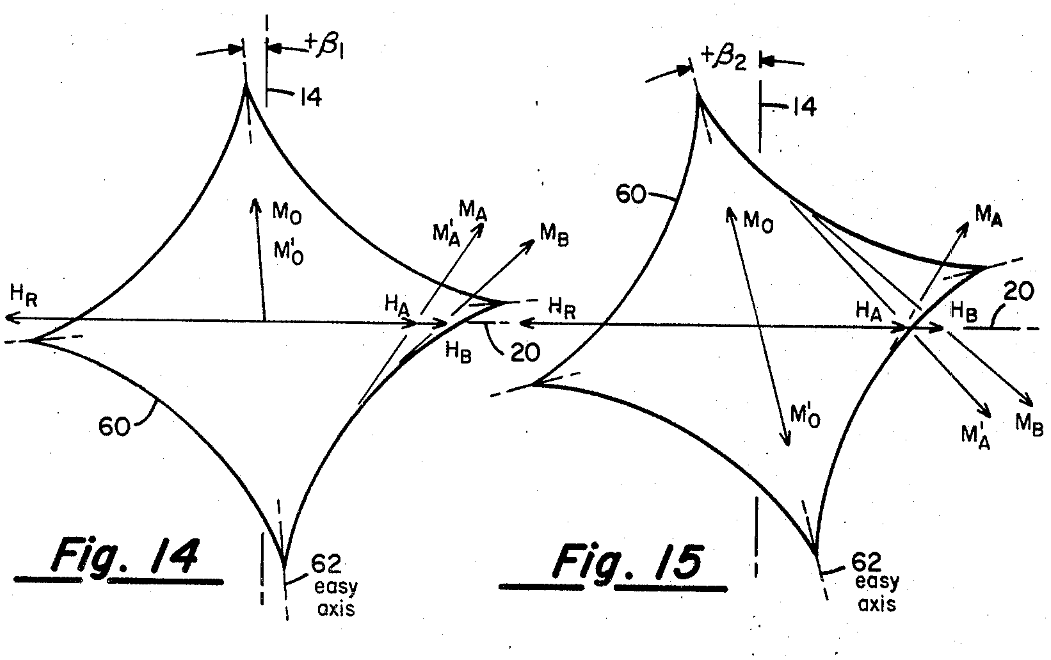
FIG. 14 is an illustration of the switching asteroid and the drive field vector relationships relating to the read-restore operation of the $+\beta 1$ informational state.
FIG. 15 is an illustration of the switching asteroid and the drive field vector relationships relating to the read-restore operation of the $+\beta 1$ informational state.

With these relative field intensities of fields $H_A$, $H_B$; for, (a) Stored $+\beta$1—both fields $H_A$ and $H_B$ are within the switching asteroid 60 (see FIG. 14).

(b) Stored $+\beta$2—field $H_A$ is within the field $H_B$ is without the switching asteroid 60 (see FIG. 15).

Figures 16, 17:
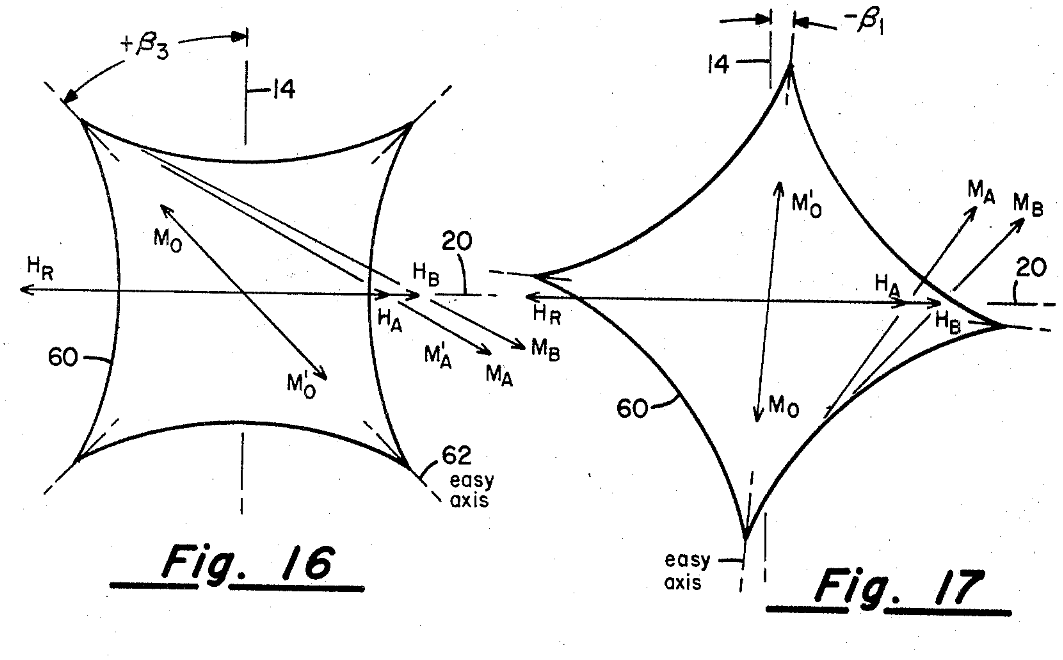
FIG. 16 is an illustration of the switching asteroid and the drive field vector relationships relating to the read-restore operation of the $+\beta 3$ informational state.
FIG. 17 is an illustration of the switching asteroid and the drive field vector relationships relating to the read-restore operation of the $-\beta 1$ informational state.

(c) Stored $+\beta 3$—both fields $H_A$ and $H_B$ are without the switch asteroid (see FIG. 16).

As can be seen from an inspection of FIGS. 14, 15 and 16 whenever the application or termination of a drive field $H_A$ or $H_B$ causes the magnetization M of layer 12 to rotate in the same continuous direction, i.e., clockwise or counter-clockwise, there are produced positive output pulses in sene line 16. Conversely, if the application or termination of a drive field $H_A$ or $H_B$ causes the magnetization M of layer 12 to reverse its rotation direction there are produced negative output pulses in sense line 16. Thus, by selecting the intensities of drive fields $H_A$ and $H_B$ of the above noted relationships with respect to each other and to the switching asteroid 60 the desired six unique serial output pulses are obtained. By arbitrarily defining a positive pulse as a "1" and a negative output pulse "0" and by gating each ordered pulse of the serial output pulses into an associated two state storage device, such as a binary stage of a binary register, the serial output pulses are interpreted as a multibit binary word. The resulting unique multibit word uniquely represents the particular one $\beta$ stored state of the readout layer 12. By comparison of FIGS. 14, 15, 16 to FIGS. 17, 18, 19 it can be seen that the opposite relationships exist whereby the serial output pulses and the corresponding multibit words of the similar but opposite polarity $\beta$ stored state, i.e., $+\beta 1$ of FIG. 14 and $-\beta 1$ of FIG. 17, are the inverse or complement of the other. An inspection of FIG. 13 shows this to be true.

Figure 7:
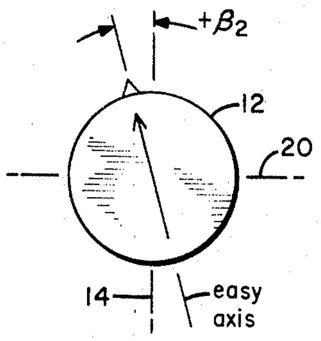
FIG. 7 is an illustration of the magnetization polarization and easy axis orientation for the $+\beta 2$ informational state.
Figure 8:
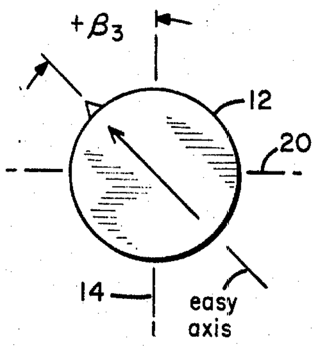
FIG. 8 is an illustration of the magnetization polarization and easy axis orientation for the $+\beta 3$ informational state.

A detailed discussion of the operation of layer 12 under the $\beta$ stored states $+\beta 1$, $+\beta 2$, $+\beta 3$ of FIGS. 6, 7 and 8, respectively, shall now proceed with respect to FIGS. 14, 15, 16, respectively, and the signal timing relationships of FIG. 13. The $\beta$ stored states $-\beta 1$, $-\beta 2$, $-\beta 3$ of FIGS. 9, 10, 11, respectively, vectorily described in FIGS. 17, 18, 19 shall not be described in detail, it being undersood the operation of similar but opposite $\beta$ stored states, such as $\beta$ stored state $+\beta 1$ of FIGS. 6 and 14 and $\beta$ stored state $-\beta$ of FIGS. 9 and 17, are of a similar but opposite nature.

(a) $\beta$ stored state $+\beta 1$ of FIGS. 6 and 14.

The application of drive field $H_A$ rotates the remanent magnetization $M_O$ of layer 12 that is aligned along axis 62 into the position $M_A$. Next, the application of drive field $H_B$ rotates the magnetization $M_A$ of layer 12 into the position $M_B$. Next, the concurrent termination of drive field $H_B$, and the application of drive field $H_A'$ rotates th magnetization $M_B$ of layer 12 into the position $M_A'$ which position is similar to position $M_A$. Finally, the termination of drive field $H_A'$ permits the magnetization $M_A'$ of layer 12 to fall back into position $M_O'$, i.e., returne to its original remanent position $M_O$.

This read pulse program induces serial output pulses 70, 72, 74 (and 76) into sense line 16. Application of the gate pulses 28, 30, 32 to gate terminals 34, 36, 38, respectively, of register 26 gates into stages $2^2$, $2^1$, $2^0$, respectively, of register 26 polarity signals representative, using a positive output signal as representative of a "1" and a negative output signal as representative of "0," of a multibit word 110 which multibit word indicates that the readout, or interrogated, layer 12 held a $\beta$ stored $+\beta 1$.

Finally, the unconditional restore drive field $H_R$ is applied to layer 12 ensuring that the magnetization M of layer 12 is restored into its initial $\beta$ stored state $+\beta 1$ of position $M_O$. Although the application of unconditional restore drive field $H_R$ to layer 12 effects no (permanent) change in the prior position of the magnetization M of layer 12, no irreversible switching having occurred during the read operation of the $\beta$ stored state $+\beta 1$ (and $-\beta 1$), such irreversible switching will occur during the read operation of the $\beta$ stored states $+\beta 2$, $+\beta 3$ (and $-\beta 2$, $-\beta 3$). Accordingly, the restore drive field $H_R$ is unconditionally applied to layer 12 after the readout operation regardless of its $\beta$ stored state. Even though this unconditional restore drive field $H_R$ is utilized in the present invention such restore drive field $H_R$ always ensures that the magnetization M of layer 12 is restored into its prior $\beta$ stored state, and, accordingly, such readout is NDRO.

(b) $\beta$ stored state $+\beta 2$ of FIGS. 7 and 15.

The application of drive field $H_A$ rotates the remanent magnetization $M_O$ of layer 12 that is aligned along axis 62 into the position $M_A$. Next, the application of drive field $H_B$ rotates the magnetization $M_A$ of layer 12 into the position $M_B$. Next, the concurrent termination of drive field $H_B$, and the application of drive field $H_A'$ rotates the magnetization $M_B$ of layer 12 into the position $M_A'$ which position is different than $M_A$ indicative of the irreversible switching of the magnetization M of layer 12. Finally, the termination of drive field $H_A'$ permits the magnetization $M_A'$ of layer 12 to fall back into position $M_O'$ which is of an opposite polarity along axis 62 than its original position $M_O$.

This read pulse program induces serial output pulses 80, 82, 84 (and 86) into sense line 16. Application of the gate pulses 28, 30, 32 to gate terminals 34, 36, 38 respectively, of register 26 gates into stages $2^2$, $2^1$, $2^0$, respectively, of register 26 polarity signals representative of a multibit word 111 which multibit word indicates that the readout, or interrogated, layer 12 held a $\beta$ stored state of $+\beta 2$.

Finally, the unconditional restore drive field $H_R$ is applied to layer 12 ensuring that the magnetization M of layer 12 is restored into its initial $\beta$ stored state $+\beta 2$ of position $M_O$ from position $M_O'$.

(c) $\beta$ stored state $+\beta 3$ of FIGS. 8 and 16.

The application of drive field $H_A$ rotates the remanent magnetization $M_O$ of layer 12 that is aligned along axis 62 into the position $M_A$. This reversal of the orientation of the magnetization M of layer 12 from position $M_O$ to position $M_B$ indicates that irreversible switching occurred in the magnetization M of layer 12. Next, the application of drive field $H_B$ rotates the magnetization $M_A$ of layer 12 into the position $M_B$. Next, the concurrent termination of drive field $H_B$ and the application of drive field $H_A'$ rotates the magnetization $M_B$ of layer 12 into the position $M_A'$ which position is similar to position $M_A$. Finally, the termination of drive field $H_A'$ permits the magnetization $M_A'$ of layer 12 to fall back into position $M_O'$ which position $M_O'$ is of an opposite polarity along axis 62 than that of its original $\beta$ stored state $+\beta 3$ of $M_O$.

This read pulse program induces serial output pulses 90, 92, 94 (and 96) into sense line 16. Application of the gate pulses 28, 30, 32 to gate terminals 34, 36, 38, respectively, register 26 gates into stages $2^2$, $2^1$, $2^0$, respectively, of register 26 polarity signals representative of a multibit word 101 which multibit word indicates that the readout, or interrogated, layer 12 held a $\beta$ stored state $+\beta 3$.

Finally, the unconditional restore drive field $H_R$ is applied to layer 12 ensuring that the magnetization M of layer 12 is restored into its original $\beta$ stored state $+\beta 1$ of position $M_O$ from position $M_O'$.

Figure 10:
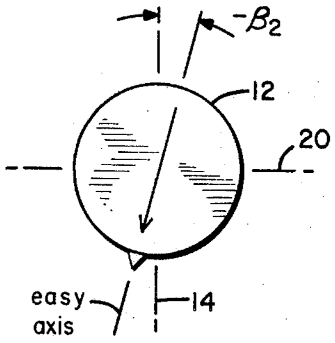
FIG. 10 is an illustration of the magnetization polarization and easy axis orientation for the $-\beta 2$ informational state.
Figure 11:
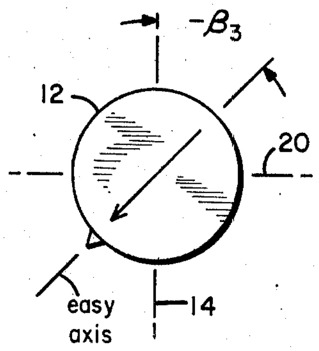
FIG. 11 is an illustration of the magnetization polarization and easy axis orientation for the $-\beta 3$ informational state.
Figures 18, 19:
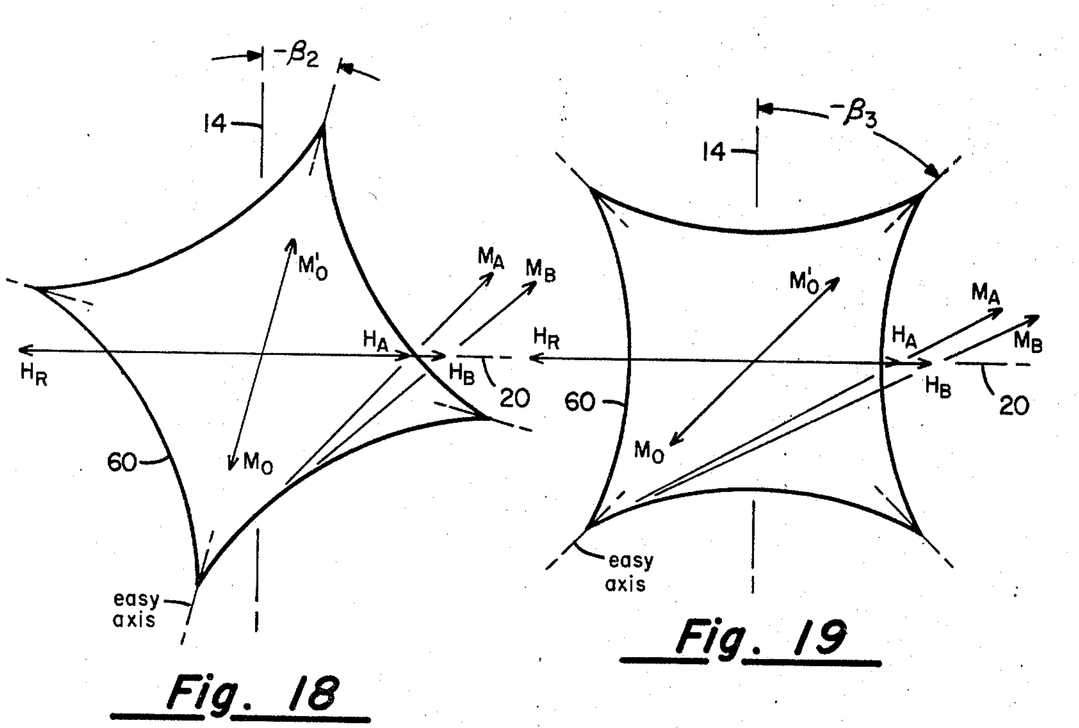
FIG. 18 is an illustration of the switching asteroid and the drive field vector relationships relating to the read-restore operation of the $-\beta 2$ informational state.
FIG. 19 is an illustration of the switching asteroid and the drive field vector relationships relating to the read-restore operation of the $-\beta 3$ informational state.

Relating the read pulse program of FIG. 13 to the $\beta$ stored state $-\beta 1$ of FIGS. 9 and 17, to the $\beta$ stored state $-\beta 1$ of FIGS. 10 and 18, and to the $\beta$ stored state $-\beta 3$ of FIGS. 11 and 19 and as discussed above with respect to the $\beta$ stored states $+\beta 1$, $+\beta 2$, $+\beta 3$ it is apparent that the multibit words 001, 000, 010, representative of the readout of the $\beta$ stored states $-\beta 1$, $-\beta 2$, $-\beta 3$, respectively, are stored in stages $2^2$, $2^1$, $2^0$ of register 26. It is apparent that the arrangement provided by both the first and second embodiment incorporates the inventive concept of the present invention achieving the method of storing NDRO information in a read-only magnetizable memory element by establishing the element's easy axis at one of a plurality of angles rotated away from, or skewed with respect to the magnetic axis of an inductively coupled sense line and the associated orthogonal word line.

The storage of the six $\beta$ data states has been reduced to practice in an embodiment similar to that shown in FIG. 1. The storage element (layer 12 of FIG. 2) consisting of an 8 millimeter diameter layer of approximately 81% Ni–19% Fe, 2000 angstroms (A.) thick having an anisotropy field $H_K$=3.55 oersteds (oe.) and a dispersion $\alpha90$=3.0°. The drive fields were provided by 3 current pulse generators driving a 0.040 inch wide copper drive line passing over the storage element with the current return provided by a ground plane under the storage element. A similar orthogonal sense line, inductviely coupled to the storage element provided the input to a sense amplifier. The values of drive current used were: $H_A$=640 milliamperes (ma.), $H_B$=800 ma., $H_R$=1600 ma. The output voltage waveforms of FIGS. 14–19 were observed for the six $\beta$ data states.

It is to be observed that by utilizing a greater number of skew angles $\beta$ and a greater number of "steps" on the read current pulse program, a greater number of distinct storage states results. For example, using eight values of skew angles $\beta$ and a read current pulse program having 3 current levels, and as a result 3 rise and 3 fall times, eight distinct $\beta$ data states can be obtained.

Thus, it is apparent that there has been described herein two preferred embodiments of the present invention that permit the storing of NDRO information in a read-only magnetizable memory element in a novel manner. It is understood that suitable modifications may be made in the structure as is disclosed provided such modifications come within the spirit and scope of the appended claims. Having, now, fully illustrated and described my invention what I claim to be new and desire to protect by Letters Patent is set forth in the appended claims.

I claim:

1. The method of reading out the informational content of a thin-ferromagnetic-film layer having a rotational switching asteroid and that is capable of storing only one of a possible 2N data states $\pm\beta$ N, said data states $\mp\beta$ N being represented by the relative direction and degree of rotation of the layer's easy axis from a sense magnetic axis that is orthogonal to a sense line that is inductively coupled to said layer and from a drive magnetic axis parallel to said sense line that is orthogonal to a drive line that is inductively coupled to said layer, the method comprising:

coupling to said drive line a stepped read current pulse program having N steps, each of said steps representing an associated read current signals amplitude providing in the area of said layer an associated read field intensity;

the application or termination of each of said N read field intensities inducing in said sense line an associated output pulse of a first or of a second and opposite polarity;

said N step read current pulse program providing 2N serial output pulse permutations in said sense line;

each of said 2N serial output pulse permutations uniquely representing the readout of an associated one of said 2N data states.

2. The method of claim 1 wherein $N$=3 providing the six data states: $+\beta$1, $+\beta$2, $+\beta$3, $-\beta$1, $-\beta$2, $-\beta$3.

3. The method of claim 2 wherein the stepped read current pulse program has three steps $H_A$, $H_B$ and $H_A'$ wherein for the:

(a) data states $\pm\beta$1 both fields $H_A$ and $H_B$ are within the switching asteroid of the layer.

(b) data states $\pm\beta$2 field $H_A$ is within and field $H_B$ is without the switching asteriod of the layer.

(c) data states $\pm\beta$3 both fields $H_A$ and $H_B$ are without the switching asteroid of the layer.

4. The method of claim 3 wherein field $H_A'$ is substantially equal to field $H_A$.

5. The method of claim 4 wherein each of said $2N$=6 serial output pulse permutations includes a pattern of three pulses each of a first or of a second and opposite polarity.

References Cited

UNITED STATES PATENTS

| | | | |
|---|---|---|---|
| 3,111,652 | 11/1963 | Ford | 340—174 |
| 3,154,768 | 10/1964 | Hardwick | 340—174 |
| 3,366,937 | 1/1968 | Fuller | 340—174 |
| 3,387,289 | 6/1968 | Walter | 340—174 |
| 3,427,600 | 2/1969 | Middelhock | 340—174 |

FOREIGN PATENTS

| | | |
|---|---|---|
| 674,392 | 11/1963 | Canada. |
| 982,677 | 2/1965 | Great Britain. |

STANLEY M. URYNOWICZ, Jr., Primary Examiner

U.S. Cl. X.R.

148—108